United States Patent
Hayden et al.

(10) Patent No.: US 10,184,448 B2
(45) Date of Patent: Jan. 22, 2019

(54) WIND TURBINE BLADE

(71) Applicant: BLADE DYNAMICS LIMITED, Southampton, Hampshire (GB)

(72) Inventors: Paul Trevor Hayden, Southampton (GB); David Anthony Whiley, Shrewsbury (GB)

(73) Assignee: BLADE DYNAMICS LIMITED, Hampshire (GB)

( * ) Notice: Subject to any disclaimer, the term of this patent is extended or adjusted under 35 U.S.C. 154(b) by 338 days.

(21) Appl. No.: 15/151,806

(22) Filed: May 11, 2016

(65) Prior Publication Data

US 2016/0333849 A1 Nov. 17, 2016

(30) Foreign Application Priority Data

May 11, 2015 (GB) .................................. 1508004.7

(51) Int. Cl.
  *F03D 1/06* (2006.01)
(52) U.S. Cl.
  CPC ...... *F03D 1/0675* (2013.01); *F05B 2240/311* (2013.01); *Y02E 10/721* (2013.01)
(58) Field of Classification Search
  CPC . F03D 1/0675; F05B 2240/311; Y02E 10/721
  See application file for complete search history.

(56) References Cited

U.S. PATENT DOCUMENTS

| | | | | |
|---|---|---|---|---|
| 9,964,096 B2* | 5/2018 | Wetzel | ................. | F03D 1/0675 |
| 2010/0135815 A1 | 6/2010 | Bagepalli et al. | | |
| 2010/0143146 A1 | 6/2010 | Bell et al. | | |
| 2011/0123346 A1 | 5/2011 | Hancock | | |
| 2012/0107129 A1 | 5/2012 | Kulenkampff et al. | | |

(Continued)

FOREIGN PATENT DOCUMENTS

| | | |
|---|---|---|
| EP | 2111971 A2 | 10/2009 |
| EP | 2881237 A1 | 6/2015 |

(Continued)

OTHER PUBLICATIONS

GB Search Report dated Nov. 12, 2015 which was issued in connection with GB Patent Application No. 1508004.7 which was filed on May 11, 2015.

(Continued)

*Primary Examiner* — Matthew W Jellett
(74) *Attorney, Agent, or Firm* — GE Global Patent Operation; Douglas D. Zhang

(57) ABSTRACT

A wind turbine blade which is at least 45 m long. The blade has a main axis in the lengthwise direction from root to tip and an aerodynamic shell surrounding a spar which extends in a lengthwise direction along a substantial proportion of the blade at least a portion of the half of the shell closest to the tip. The blade is reinforced by high stiffness fibers having a Young's modulus to density ratio of greater than 50 GPa/(g·cm$^{-3}$), and an electrical resistivity of greater than $10^{10}$ Ω·cm. The fibers are biaxial with a first axis angled with respect to the main axis at an acute angle and a second axis angled with respect to the main axis at an acute angle in the opposite sense to the first angle.

14 Claims, 3 Drawing Sheets

(56) References Cited

U.S. PATENT DOCUMENTS

| | | | | |
|---|---|---|---|---|
| 2014/0119931 A1* | 5/2014 | Datta | ............... | B29C 70/443 |
| | | | | 416/223 R |
| 2014/0154092 A1* | 6/2014 | Dahl | ............... | F03D 1/0675 |
| | | | | 416/229 R |
| 2014/0178204 A1* | 6/2014 | Livingston | ............ | B29C 70/443 |
| | | | | 416/230 |
| 2014/0193269 A1* | 7/2014 | Wetzel | ............ | F03D 1/0675 |
| | | | | 416/230 |
| 2014/0356181 A1* | 12/2014 | Mailly | ............ | F03D 1/0641 |
| | | | | 416/229 A |
| 2016/0176127 A1* | 6/2016 | Borsting | ............ | B29C 70/386 |
| | | | | 264/138 |
| 2016/0288429 A1* | 10/2016 | Bergstrom | ............ | B29C 70/48 |

FOREIGN PATENT DOCUMENTS

| | | |
|---|---|---|
| WO | 03078832 A1 | 9/2003 |
| WO | 2010022739 A2 | 3/2010 |
| WO | 2013010979 A2 | 1/2013 |

OTHER PUBLICATIONS

European Search Report and Written Opinion issued in connection with corresponding EP Application No. 16168479.0 dated Sep. 28, 2016.

* cited by examiner

Figure 1 - Approximate properties for fibres

Table 1 - Approximate properties for fibres

|  |  | Carbon | E-Glass | Aramid | Basalt |
|---|---|---|---|---|---|
| Electrical Resistivity | Ω.cm | 1.00E-02 | 4.00E+14 | 5.00E+14 | 4.00E+14 |
| Stiffness | GPa | 230 | 70 | 130 | 90 |
| Density | g.cm$^{-3}$ | 1.8 | 2.56 | 1.44 | 1.7 |
| Specific Modulus | GPa/(g.cm$^{-3}$) | 128 | 27 | 90 | 53 |

WIND TURBINE BLADE

CROSS-REFERENCE TO RELATED APPLICATIONS

The present application claims foreign priority benefit under 35 U.S.C. § 119 to commonly-owned Great Britain Patent Application No. 1508004.7 filed 11 May 2015, which is hereby incorporated by reference in its entirety.

BACKGROUND

Embodiments of the present invention relate to a wind turbine blade.

In particular, embodiments of the present invention relate to a large scale wind turbine blade which is at least 45 meters long from root to tip.

Wind turbine blades of increasing length are desirable as the increase in length of the blade produces a disproportionately high increase in the power output for unit cost. However, the ever increasing length of wind turbine blades produces new technical challenges. To some extent, existing blade technology can simply be scaled up as it is. However, this can only go so far before problems arise.

One particular problem with long wind turbine blades is that of torsional stiffness. Typically, as the blade length increases, inadequate torsional stiffness results in excessive twist of the blade, problems with flutter and other instabilities.

The way that the stiffness has routinely been improved is to increase the amount of glass fibre in the laminate lay-up as the blade is formed. This additional glass fibre is normally placed in the outer aerodynamic structural shell of the blade. This aerodynamic shell forms a "torsion box" which effectively deals with the torsional stability of the blade. The fibre is typically placed in a biaxial arrangement. However, this is not mass or cost effective as a significant amount of glass fibres is required.

BRIEF SUMMARY OF THE INVENTION

Embodiments of the present invention provides a long blade with improved torsional stiffness and relies on the targeted use of high stiffness fibres.

Thus, embodiments of the present invention go against the conventional wisdom of simply increasing the amount of glass fibre in the laminate. This allows a higher torsional stiffness to be achieved at the same mass as a conventional blade or for a comparable torsional stiffness to be achieved at a reduced mass. The use of the more expensive fibres is more than compensated for by the other benefits in other parts of the blade that accrue from reducing the mass towards the outer region of a relatively large blade. In particular, further mass reductions can be achieved in other portions of the blade as a larger mass does not need to be supported.

The use of relatively expensive fibres is also mitigated because these are targeted in the region of the blade which is most prone to twisting.

Embodiments of the present invention also remove the need to increase the thickness of the aerodynamic shell of the blade. This might otherwise be necessary in order to accommodate enough fibres to achieve the required torsional stiffness but can reduce the aerodynamic performance of the blade and increase the mass as mentioned above.

The most common high stiffness fibre which might normally be used in this context is carbon fibre. However, this is not appropriate for use in the present invention as it has low electrical resistivity (high electrical conductivity). This can cause significant problems when lightning strikes the outer surface of the blade. The present invention therefore avoids the use of the most common high stiffness fibre in favour of a fibre with a relatively high electrical resistivity.

In an embodiment, the fibres have a Young's modulus to density ratio of greater than 60 $GPa/(g \cdot cm^{-3})$ and more particularly greater than 70 $GPa/(g \cdot cm^{-3})$. The high stiffness fibres may be Basalt or other high Young's modulus fibres that have very high electrical resistivity. In another embodiment, these fibres are aramid. The relative properties of the fibres are shown in FIG. 5.

In an embodiment, these high stiffness fibres, extend along at least 20% and more particularly at least 30% of the blade length. The fibres are, however, preferably not present all the way to the tip of the blade, as they will have little effect in the immediate vicinity of the tip. Some high stiffness fibres may be present in the radially innermost half of the blade closest to the tip. However, at least the radially innermost third of the blade and more particularly the radially innermost half of the blade is substantially free from the high stiffness fibres.

The reference to the blade being substantially free from the high stiffness fibres means that it is possible that some such high stiffness fibres are present, but in a quantity which makes no practical difference. If this region also has low stiffness fibres, the region can be thought of as being substantially free from the high stiffness fibres if less than 10% of the multiaxial fibres are high stiffness fibres. If the region has no low stiffness fibres, a region can be thought of as being substantially free from the high stiffness fibres if the density of fibres at this point is less than 10% of the density of the fibres at the region of highest density.

In an embodiment, the shell is also reinforced by low stiffness fibres such as e-glass fibres. These may be present in a number of areas. Firstly, they may be present as unidirectional fibres alongside the biaxial high stiffness fibres, such that only the biaxial fibres in this region are high stiffness fibres. Alternatively, or additionally, they may be present as biaxial fibres in the regions of the blade which have substantially no high stiffness fibres.

The blade may also be reinforced with fibres which extend substantially in the lengthwise direction.

The biaxial fibres may be oriented at an angle of between 40° and 50°, and more particularly at 45° with respect to the main axis. This orientation is the optimum for maximising the torsional stiffness.

BRIEF DESCRIPTION OF THE DRAWINGS

An example of a wind turbine blade in accordance with embodiments of the present invention will now be described with reference to the accompanying drawings, in which.

DETAILED DESCRIPTION

A conventional wind turbine blade is essentially made up of an aerodynamic shell 1 which defines the shape of the blade supported by the spar 2 which provides the primary bending stiffness and strength of the blade. There may also be a trailing edge spar 3 to provide additional stiffness in the vicinity of the trailing edge.

Figure 1:
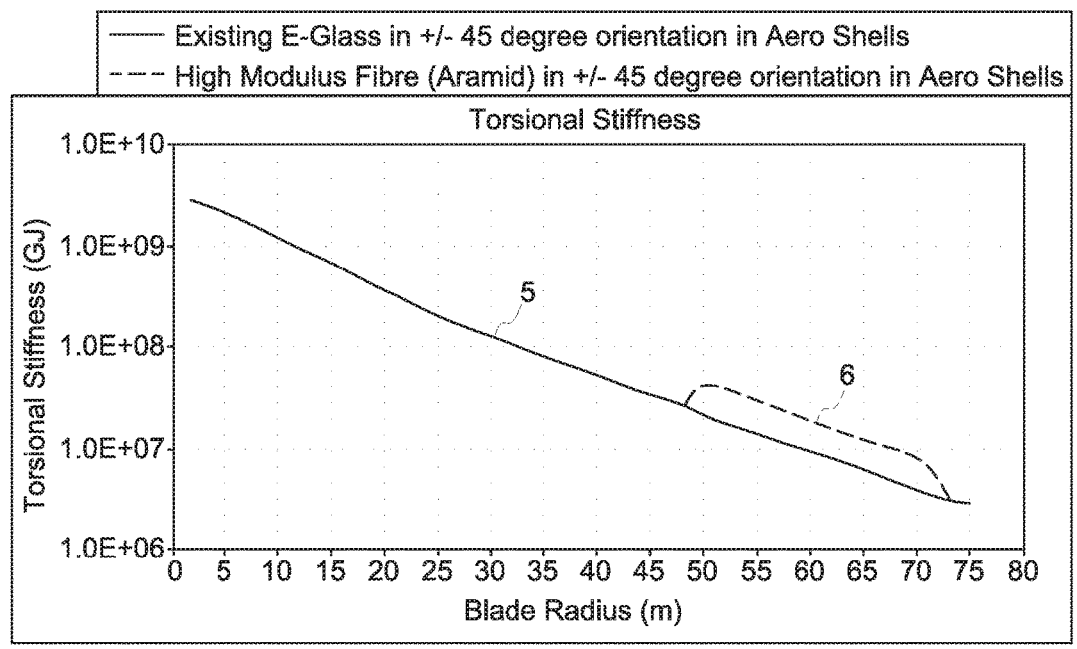
FIG. 1 is a graph showing the torsional stiffness of the blade against the radius of the blade according to various aspects described herein.
Figure 2:
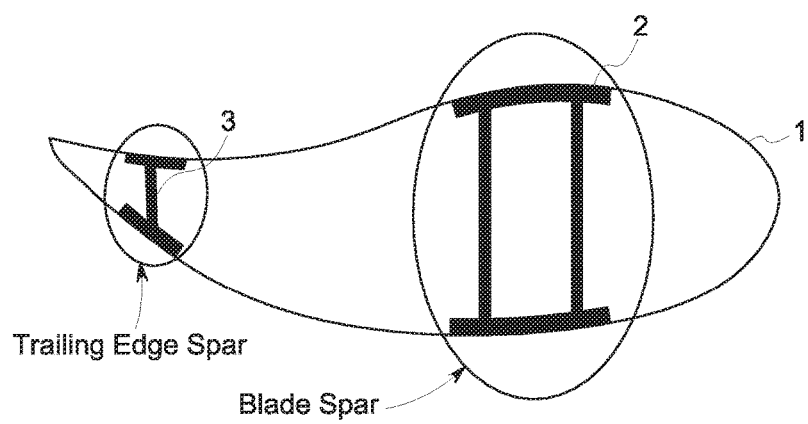
FIG. 2 is a cross-section through a blade showing the basic blade components.

Embodiments of the present invention is concerned with improvements to the shell 1. This shell effectively forms a "torsion box" which determines the ability of the blade to resist twisting. Along the length of the blade, the tapering nature of the blade means that the cross-section of the shell 1 and hence the size of the "torsion box" decreases towards the tip. This causes the reduction in torsional stiffness of a conventional blade and is depicted by line 5 in FIG. 1. With ever increasing blade length, there comes a point where the torsional stiffness in the outer half of the blade becomes unacceptably low with a conventional blade design as the size of the blade means that the torsional loading is still significant at this point.

Figure 3:
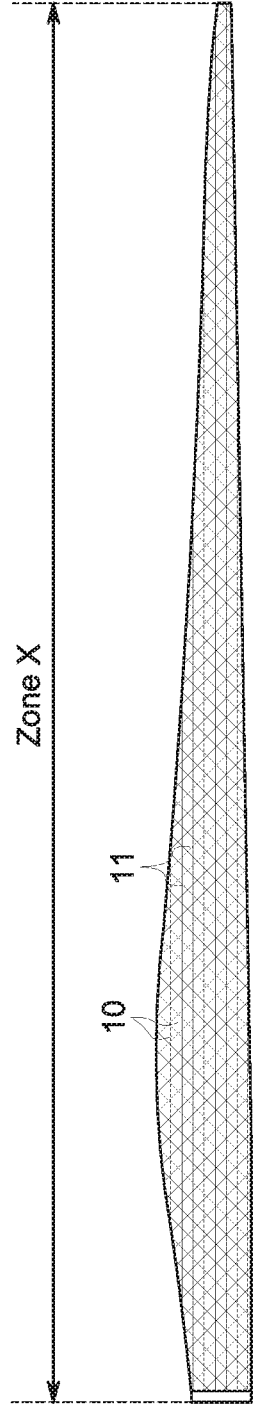
FIG. 3 is a plan view of a conventional blade showing the conventional fibre arrangement.

A conventional fibre structure is shown in FIG. 3. Essentially, the fibre structure is generally the same along the length of the blade. This comprises a number of axial fibres 10 as well as a number of biaxial fibres 11 arranged at ±45° to the blade axis. These are formed of e-glass.

Figure 4:
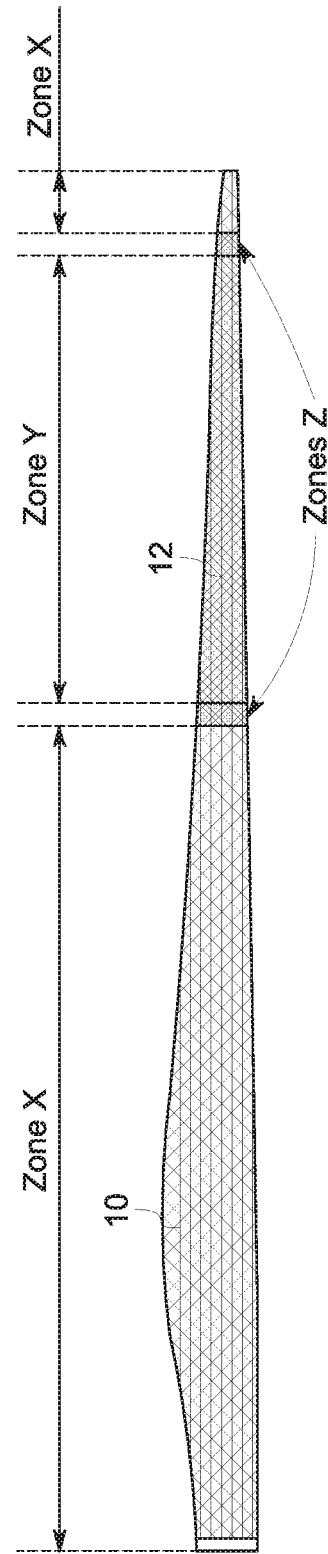
FIG. 4 is a view similar to FIG. 3 showing one example of the fibre arrangement of an embodiment of the present invention.
Figure 5:
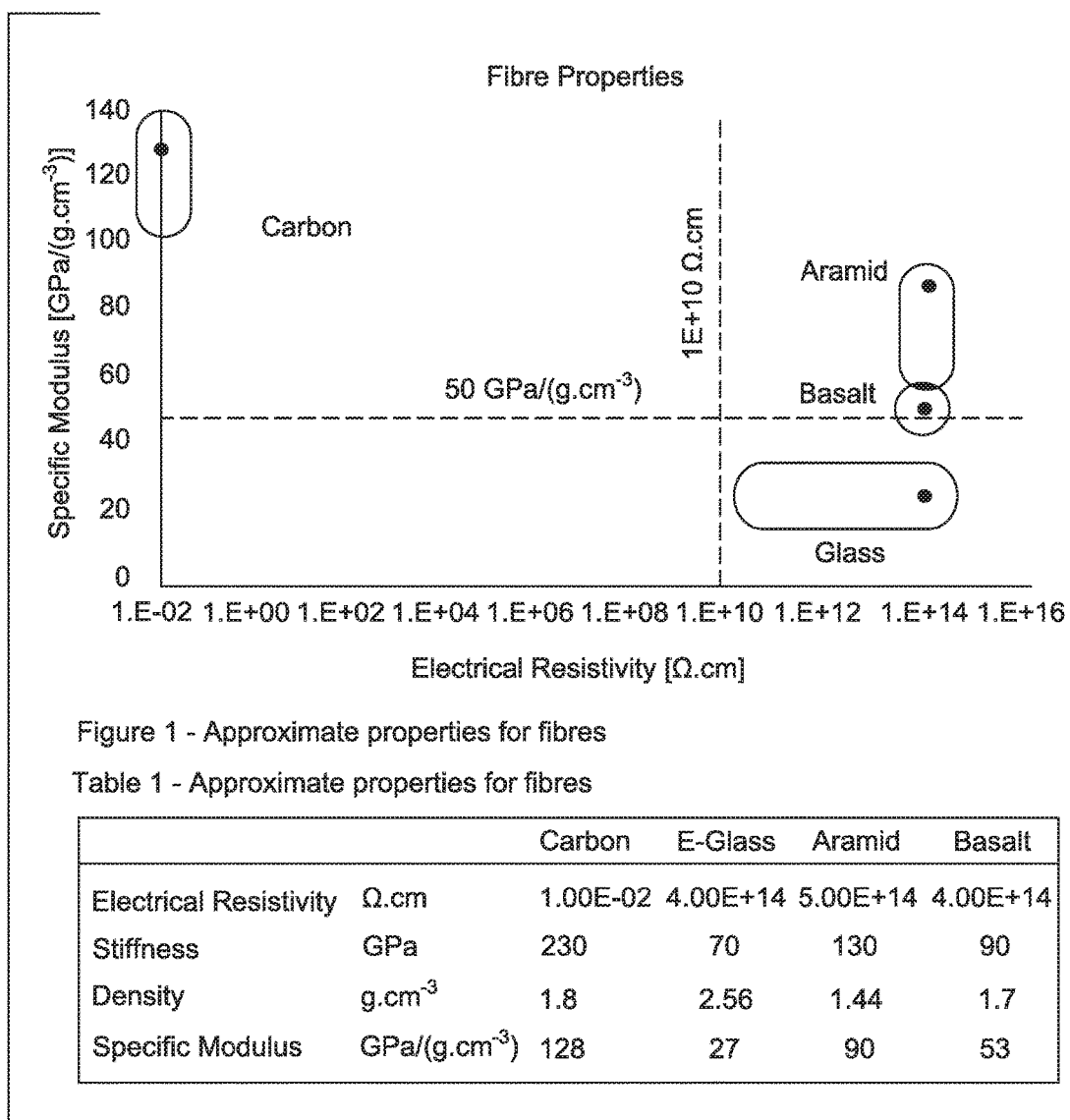
FIG. 5 is a graph showing the approximate fibre properties of the fibres in accordance with various aspects described herein.

The improvement provided by the present invention is highlighted by the differences between FIGS. 3 and 4.

Thus, in FIG. 4 in the two regions labelled as Zone X, the fibre structure is the above fibre structure of FIG. 3 with the combination of uniaxial and biaxial e-glass fibres. The blade shown in FIG. 4 is an 80 meter blade and Zone X is shown extending for the first 50 meters and the final 5 meters of the blade. The exact extent of this region is variable.

In Zone Y (which runs for the remainder of the blades with the exception of two transitional zones (Zones Z in FIG. 4 which extend for 2 to 3 meters). Zone Y is made up of the same axial e-glass fibres that run along the two regions of Zone X. In an embodiment, these axial fibres are continuous along the length of the blade. However, in this region, the multi-axial fibres arranged at ±45° to the blade axis are aramid fibres 12. In Zone Z, the ±45° fibres are both e-glass and aramid with the e-glass fibres being gradually phased out in favour of the aramid fibres in the approach to zone Y. For example, if there is more than one layer of fibres, the layers of one material may be gradually switched for the other along the length of zone Z.

The expression ±45° used to describe the multiaxial fibres is the traditional way of referring to such fibres. The 45° angle is the optimum angle at which to arrange such fibres. However, some departure from the exact 45° angle is possible while still allowing the multiaxial fibres to function adequately.

It should be noted that the spacing of the fibres is shown greatly exaggerated in FIGS. 3 and 4 and will, in practice, be a conventional spacing. The density of the fibres may be the same in each zone. The matrix is a standard matrix material such as epoxy, polyester, vinyl ester or polyurethane.

As a result of the higher stiffness fibres, the torsional stiffness of the blade is greatly increased in the region of zone Y. This increase is shown as line 6 in FIG. 1 which represents the increase in stiffness of a blade in which in Zones Y and Z the conventional e-glass fibres are replaced with the same number and arrangement of aramid fibres.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A wind turbine blade comprising:
a main axis in a lengthwise direction from root to tip; and
an aerodynamic shell surrounding a spar which extends in the lengthwise direction along a substantial proportion of the blade,
wherein the wind turbine blade is at least 45 m long,
wherein at least a portion of a half of the shell closest to the tip being reinforced by high stiffness fibres having a Young's modulus to density ratio of greater than 50 GPa/(g·cm$^{-3}$), and an electrical resistivity of greater than $10^{10}$ Ω·cm,
wherein the high stiffness fibres being biaxial with a first axis angled with respect to the main axis at an acute angle and a second axis angled with respect to the main axis at an acute angle in an opposite sense to the first axis angle, and
wherein at least the radially innermost third of the shell and a zone of the shell extending from a leading edge of the blade to a trailing edge of the blade and adjacent the tip are free from the high stiffness fibres.

2. The wind turbine blade according to claim 1, wherein the high stiffness fibres have a Young's modulus to density ratio of greater than 60 GPa/(g·cm$^{-3}$).

3. The wind turbine blade according to claim 1, wherein the high stiffness fibres are aramid.

4. The wind turbine blade according to claim 1, wherein the high stiffness fibres extend along at least 20% of the blade length.

5. The wind turbine blade according to claim 4, wherein the high stiffness fibres extend along at least 30% of the blade length.

6. The wind turbine blade according to claim 1, wherein at least the radially innermost half of the shell is substantially free from the high stiffness fibres.

7. The wind turbine blade according to claim 1, wherein the shell is also reinforced by low stiffness fibres which have a lower Young's modulus than the high stiffness fibres.

8. The wind turbine blade according to claim 7, wherein the low stiffness fibres are present as unidirectional fibres alongside the high stiffness fibres wherein the high stiffness fibres are biaxial.

9. The wind turbine blade according to claim 7, wherein the low stiffness fibres are present as biaxial fibres in the regions of the shell which have substantially no high stiffness fibres.

10. The wind turbine blade according to claim 7, wherein the shell is also reinforced with radial fibres which extend substantially in a radial direction.

11. The wind turbine blade according to claim 10, wherein the radial fibres are low stiffness fibres.

12. The wind turbine blade according to claim 7, wherein the low stiffness fibres are e-glass fibres.

13. The wind turbine blade according to claim 9, wherein the biaxial fibres are oriented at an angle of between 40 and 50° with respect to the main axis.

14. The wind turbine blade according to claim 9, wherein the biaxial fibres are oriented at an angle of substantially 45° with respect to the main axis.

\* \* \* \* \*